(12) United States Patent
Mayer et al.

(10) Patent No.: US 9,707,866 B2
(45) Date of Patent: Jul. 18, 2017

(54) VEHICLE SEATING SYSTEM

(71) Applicant: Lear Corporation, Southfield, MI (US)

(72) Inventors: John M. Mayer, Canton, MI (US);
John David Hoeschele, Canton, MI (US); Thomas O'Brien, Troy, MI (US);
Jason G. Bauman, Birmingham, MI (US); Charles A. Richlie, Novi, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 14/711,147

(22) Filed: May 13, 2015

(65) Prior Publication Data

US 2015/0329018 A1 Nov. 19, 2015

Related U.S. Application Data

(60) Provisional application No. 61/992,863, filed on May 13, 2014.

(51) Int. Cl.
| | |
|---|---|
| *B60N 2/02* | (2006.01) |
| *B60N 2/48* | (2006.01) |
| *B60N 2/235* | (2006.01) |
| *B60N 2/30* | (2006.01) |
| *B60N 2/20* | (2006.01) |
| *B60N 2/22* | (2006.01) |

(52) U.S. Cl.
CPC ......... *B60N 2/2352* (2013.01); *B60N 2/0244* (2013.01); *B60N 2/206* (2013.01); *B60N 2/3009* (2013.01); *B60N 2/3011* (2013.01); *B60N 2/0232* (2013.01); *B60N 2/22* (2013.01); *B60N 2/2213* (2013.01); *B60N 2/305* (2013.01); *B60N 2/3065* (2013.01); *B60N 2002/0236* (2013.01); *B60N 2002/0272* (2013.01)

(58) Field of Classification Search
CPC ........ B60N 2/305; B60N 2/22; B60N 2/0232; B60N 2/3065; B60N 2/2213; B60N 2002/0236
USPC .............. 297/362.11, 354.1, 353, 378.1, 330
See application file for complete search history.

(56) References Cited

U.S. PATENT DOCUMENTS

| | | | |
|---|---|---|---|
| 5,203,600 A * | 4/1993 | Watanabe ............ | B60N 2/4221 180/282 |
| 6,540,295 B1 | 4/2003 | Saberan et al. | |
| 7,278,682 B2 * | 10/2007 | Friedman ............. | B60N 2/0276 297/216.1 |
| 7,320,501 B2 | 1/2008 | Keyser et al. | |
| 7,460,005 B2 | 12/2008 | Nathan et al. | |

(Continued)

*Primary Examiner* — Chi Q Nguyen
(74) *Attorney, Agent, or Firm* — Brooks Kushman P.C.

(57) ABSTRACT

A system and method for controlling movement of a seat in a vehicle includes a lower seat assembly and an upper seat assembly adjustable relative to the lower seat assembly. An actuator assembly pivotally attached between the lower seat assembly and upper seat assembly selectively adjusts the upper seat assembly relative to the lower seat assembly between at least one upright position and at least one folded position. A control unit selectively actuates a motor and the actuator assembly to control movement of the upper seat assembly relative to the lower seat assembly. The control unit adjusts the position of the actuator assembly to releasably secure the motor in response to the position value detected by a sensor assembly to place the upper seat assembly in position relative to the lower seat assembly.

15 Claims, 5 Drawing Sheets

(56) References Cited

U.S. PATENT DOCUMENTS

| | | | |
|---|---|---|---|
| 7,547,070 B2 | 6/2009 | Nathan et al. | |
| 7,703,852 B2 | 4/2010 | Wahls et al. | |
| 7,808,394 B2 | 10/2010 | Nathan et al. | |
| 7,866,696 B2* | 1/2011 | Wang | B60N 2/0276 280/748 |
| 2007/0265738 A1* | 11/2007 | Saito | B60N 2/0248 701/2 |
| 2008/0231103 A1* | 9/2008 | Rohee | B60N 2/20 297/354.1 |
| 2010/0066137 A1* | 3/2010 | Sakai | B60N 2/002 297/217.3 |
| 2011/0221247 A1* | 9/2011 | Hashimoto | B60N 2/0232 297/216.13 |
| 2012/0032482 A1* | 2/2012 | Hashimoto | B60N 2/0276 297/216.13 |
| 2013/0154534 A1* | 6/2013 | Okada | B60N 2/0232 318/490 |
| 2014/0210239 A1* | 7/2014 | Yetukuri | G06F 3/044 297/217.1 |
| 2014/0217792 A1* | 8/2014 | Meyer | H02H 7/122 297/284.8 |
| 2015/0375643 A1* | 12/2015 | Fisher | B60N 2/015 297/334 |

* cited by examiner

Parked condition
Actuator Motor Released and
Drive Motor OFF

Drive Condition
Actuator Motor Pull and Hold
followed by Drive Motor ON

Stop Condition
Drive Motor OFF followed by
Actuator Motor Release

Parking Condition*
Drive Motor Movement to ensure
Actuator is seated

VEHICLE SEATING SYSTEM

CROSS-REFERENCE TO RELATED APPLICATIONS

This application claims the benefit of U.S. provisional application Ser. No. 61/992,863 filed May 13, 2014, the disclosure(s) of which is hereby incorporated in its entirety by reference herein.

TECHNICAL FIELD

The present invention relates to a system and method for adjusting the position of a vehicle seat.

BACKGROUND

A wide variety of vehicle seating arrangements are available for vans, minivans, and sport utility vehicles. Vehicle seating systems may add versatility to vehicles that is derived from the ability to provide different seating configurations. Vehicle seating systems may include seats that are used in a conventional seating configuration or may be converted to provide a full or partial load floor for hauling materials.

Many vehicle seating systems are manual and require a person to release a lever and reposition various portions of the seat to convert the seat to different modes. It is known in the art to use electronically controlled components to provide for assisted positioning of the components of the vehicle seat. Various types of power folding vehicle seating systems and methods are described in the following patents: U.S. Pat. Nos. 6,540,295, 7,460,005 and 7,808,394.

SUMMARY

At least some embodiments of the present invention include a seat control system for a vehicle and a method of controlling movement the seat disposed in the vehicle. The system includes a lower seat assembly and an upper seat assembly adjustable relative to the lower seat assembly. An actuator assembly pivotally attached between the lower seat assembly and upper seat assembly selectively adjusts the upper seat assembly relative to the lower seat assembly between at least one upright position and at least one folded position.

A control unit selectively actuates a motor and the actuator assembly to control movement of the upper seat assembly relative to the lower seat assembly. The control unit adjusts the position of the actuator assembly to releasably engage the motor in response to the position value detected by a sensor assembly to place the upper seat assembly in position relative to the lower seat assembly.

At least another embodiment of the invention contemplates a method for controlling movement of a seat in a vehicle. An upper seat assembly is adjustable between at least one upright position and at least one folded position relative to the lower seat assembly. An actuator assembly is provided between the lower seat assembly and upper seat assembly for selectively adjusting the upper seat assembly relative to the lower seat assembly and a motor coupled with and selectively engaging the actuator assembly.

The position of the upper seat assembly is adjusted relative to the lower seat assembly to one of the at least one upright or at least one folded positions. A sensor assembly detects the position of the upper seat assembly relative to the lower seat assembly and transmits the position to a control unit. The control unit adjusts the position of the actuator assembly and motor such that the actuator assembly releasably engages the motor based upon the position of the upper seat assembly to releasably secure the upper seat assembly relative to the lower seat assembly in one of the at least one upright or at least one folded positions.

DETAILED DESCRIPTION

Figure 1:
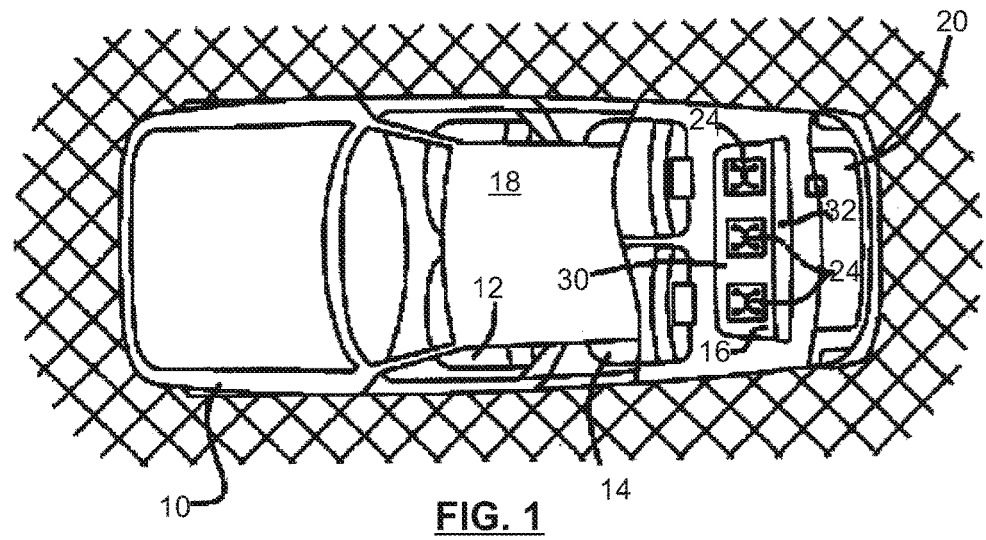
FIG. 1 is a partially fragmented top plan view of a vehicle having three rows of seats in accordance with embodiments of the present invention.

As required, detailed embodiments of the present invention are disclosed herein; however, it is to be understood that the disclosed embodiments are merely exemplary and that various and alternative forms may be employed. The embodiments are included in order to explain principles of the disclosure and not to limit the scope thereof, which is defined by the appended claims. Details from two or more of the embodiments may be combined with each other. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present invention.

With references to the Figures, a more detailed description of embodiments of a system and method for controlling the adjustment of a vehicle seat will be described. For ease of illustration and to facilitate understanding, throughout the following description similar reference numerals have been used to denote similar elements, parts, items or features in the drawings, where applicable.

Referring to FIG. 1, a vehicle 10 such as a minivan, sport utility vehicle, or other vehicle having a seat system that may be folded into a cargo-carrying configuration is illustrated. In one non-limiting embodiment, seat system of the vehicle 10 shown in FIG. 1 with a first row of seats 12, a second row of seats 14 and a third row of seats 16. The roof 18 and hatchback 20 of the vehicle 10 is partially cut-away in FIG. 1 to reveal the third row of seats 16. For exemplary purposes, the third row of seats 16 include one or more seat bottoms, individual seats bottoms shown by reference number 24 and collectively by reference number 30 and one or more seat backs 32 connected thereto. The seat back 32 of the third row seat 16 is shown in its generally upright or seating position.

Figure 2:
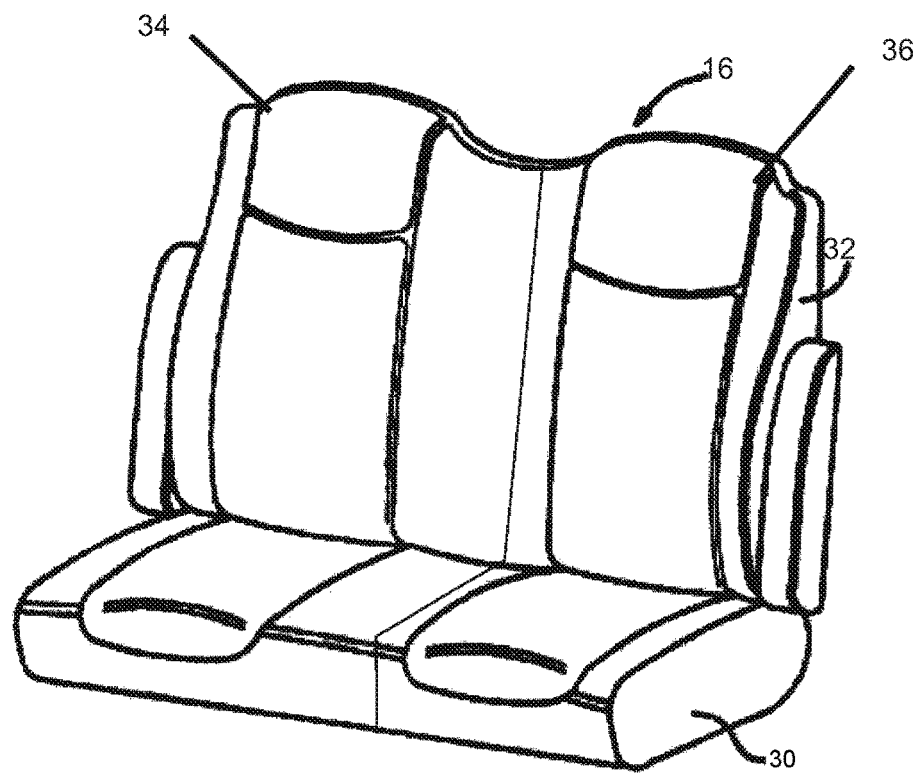
FIG. 2 is a perspective view of a row of seats having a 60/40 split seating arrangement for the vehicle seating system in accordance with embodiments of the present invention.

Referring to FIG. 2, seat system includes a row of seats 16 is shown to include a lower seat assembly or bottom 30 and an upper seat assembly or back 32 pivotally attached to the base. The base and back may be made of one or more components including a foam bun that forms a supporting seat body that is covered by fabric, vinyl, leather or the like, as is well known in the art. Seating rows 14, 16 may each be assembled as a single unit. Alternatively, as shown in FIG. 2, seat system may include a row of seats includes a first seating portion or module 34 and a corresponding second seating portion or module 36. Seating modules 34, 36 may be divided to allow the first and second seating modules 34, 36 to be adjusted from an upright or seated position to a folded or stowed position to create cargo area in the vehicle.

Figure 3:
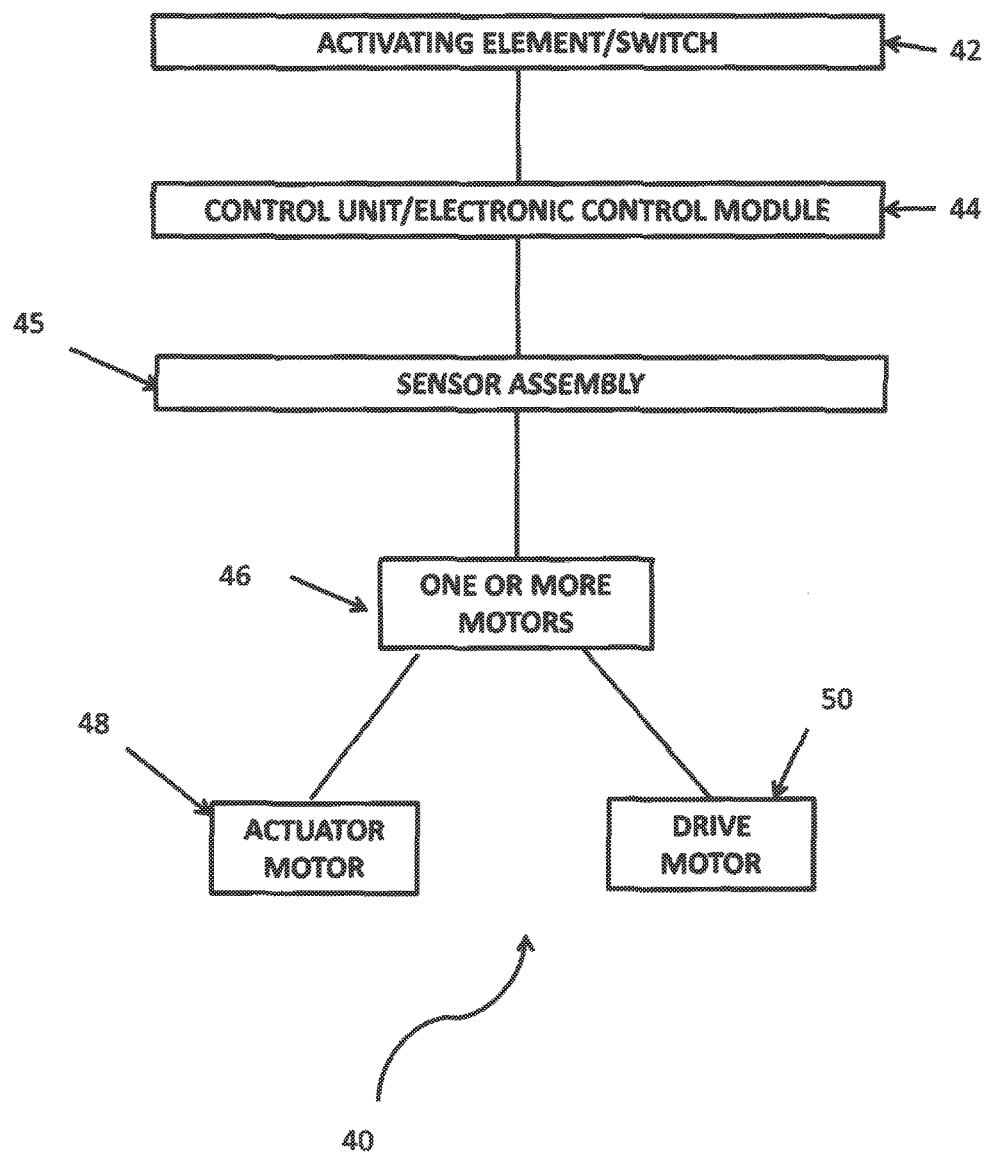
FIG. 3 is a flowchart representation of the seating control system in accordance with embodiments of the present invention.

Referring to FIG. 3, a seat control system 40 is shown diagrammatically. One or more activation elements or control switches 42 may be provided on the vehicle in a variety of locations, such as the vehicle instrument panel, console or near a door, among a number of locations in the vehicle. Activation elements 42 are configured to receive user input to allow a user to adjust the position of the first and second seating modules between an upright position and a folded position within the vehicle. The control switch may also be provided on a key fob, if desired.

A control unit or electronic control module 44 is operably connected to the first and second seating modules in the vehicle. One or more sensors 45 in electrical communication with the control unit 44 monitor operation of the one or more motors 46. In at least one embodiment of the invention, the first and second seating modules each include a seat bottom and a seat back being rotatable relative to the seat bottom about a recliner mechanism. The at least one motor is operatively connected to the seat back and in electrical communication with the control unit to rotate the seat back relative to the seat bottom.

In one of the embodiments of the invention, the one or more motors 46 may include an actuator motor 48 and a drive motor 50. Motors 48, 50 may be electric and reversible or, alternatively, could be a linear motor or cylinder, depending upon the design of the seat 16. A seat actuation element may be configured to interact with elements of the seat 16 so as to facilitate seat folding. An exemplary actuating system for a vehicle seat is described and claimed in Applicant's issued U.S. Pat. No. 7,320,501, among others, which is hereby incorporated by reference in its entirety.

The seat 16 and seat actuation element may include any number of features, devices, linkages, controllers, and other operable elements required to facilitate seat folding operations, such as those associated with U.S. Pat. No. 7,547,070, the disclosure of which is hereby incorporated in its entirety. The present invention, however, is not intended to be limited to vehicles and fully contemplates its application to any environment where it may be desirable to facilitate seat folding, such as but not limited watercraft, aircraft, non-vehicle seating, and the like. As such, the seat 16 and seat actuation element may include any number of other elements and capabilities in order to facilitate seat folding operations in such other environments.

The seat actuation element may be an electrically operable element in that may be configured to electrically execute or instigate seat folding in response to signals received from a key fob and/or a seat switch 42. For example, the seat actuation element may include a controller or other element (not shown) configured to receive signals from the key fob, switch 42 or other aforementioned signal sources to electrically facilitate folding the seat 16 as a function thereof.

The seat 16 may include springs, hydraulics, or other features controlled, instructed, or otherwise manipulated with electrical signals. The seat actuation element may communicate with such electrically controllably elements so as to facilitate seat folding operations. The folding may occur from a use or upright position to a non-use or folded position, from the non-use or folded position to the use or upright position, and/or from or to any number of other positions, including positions dependent on the configurations and capabilities of the seat 16 and seat actuation element.

The activation element or switch 42 may be positioned locally on the vehicle in an area proximate to the seat 16, such as but not limited to a position within the vehicle from which the user thereof is able to view the seat 16 and elements or persons thereon or in close proximity thereto. Optionally, the seat switch may be positioned at other areas of the vehicle 10. The switch 42 may be actuated with a depressive force or other user triggerable actuation such that the user must be within reach or otherwise in contact with the switch 22 in order to electronically control seat folding.

Activation element 42 may include buttons, touch-screens, or other user actuated features (not shown). These features may be associated with seat folding controls associated with the seat 16 and seat actuation element such that a user may control seat folding operations, i.e., to control folding the seat up and down. Optionally, the vehicle may include multiple switches to facilitate seat folding from different areas of the vehicle 10.

In one of the embodiments of the invention, a feedback apparatus may be provided as part of the seat control system to provide an operator perceptible output that can warn the operator that the seat folding operation was not completed. The feedback apparatus may provide an indication that a foreign object is on the seat or another reason for the failure of the seat to complete its seat folding operation. For example, the feedback apparatus may provide information to advise the operator that the seat folding operation was interrupted.

Referring now to FIGS. 4a-4d and FIG. 5, a description of the interaction of the drive and actuator motor gear components for use with a reclining mechanism of the seating system is discussed in greater detail. The control unit or electronic control module of the seat control system is in electrical communication with the at least one drive motor and at least one actuator assembly or motor to adjust the seat bottom and seat back of the first and second seating modules from at least one seating or upright position to at least one folded or stored position. It is contemplated that the electronic control module monitors the state of the drive motor and the actuator with one or more sensors of a sensor assembly while adjusting the seat components such that the gear teeth driven by the actuator are seated in the gear teeth of the drive motor in the reclining mechanism when a seat movement operation is completed.

Figure 5:
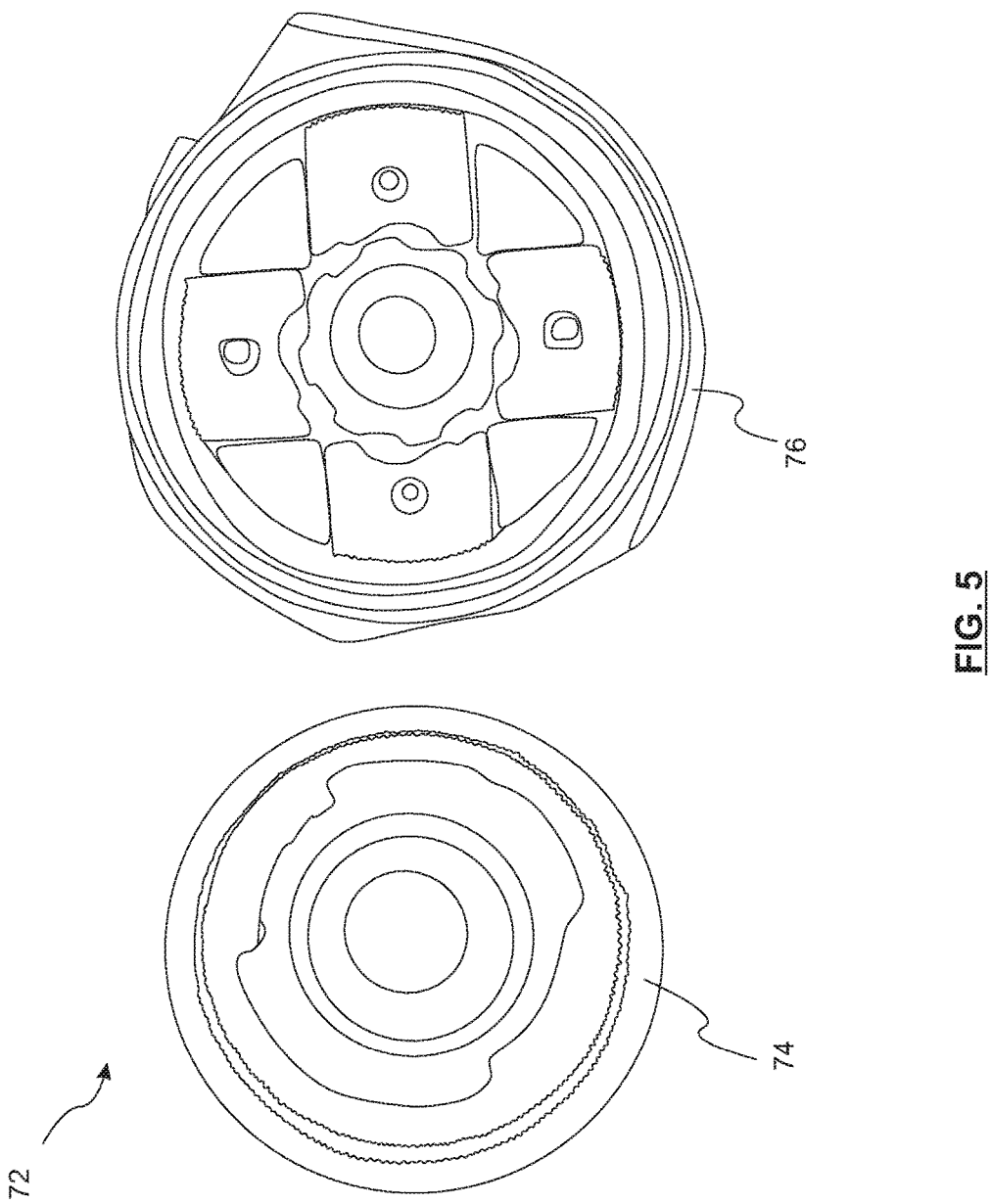
FIG. 5 is a side plan view of a recliner mechanism for use with embodiments of the present invention.

FIG. 5 illustrates a recliner mechanism for use with the vehicle seat of the present invention. In at least one of the embodiments of this invention, one or more recliner mechanisms 72 are mechanically interconnected to assist in the pivotal movement of a seat back relative to a seat bottom. An exemplary recliner mechanism interconnected with the vehicle seat are described and claimed in Applicant's issued U.S. Pat. No. 7,703,852, among others, which is hereby incorporated by reference in its entirety. The recliner mechanism 72 includes a guide plate 74 adapted to be secured to one of the seat base or seat back and a pivotal plate 76 adapted to be secured to the other of the seat base or seat back. Guide plate 74 is shown with gear teeth dispersed around the circumference of the plate. Pivotal plate 76 includes a plurality of engaging members, each having a plurality of gear teeth dispersed about a portion of the periphery, to engage the gear teeth on the guide plate.

Referring back to FIGS. 4a-4d, each figure illustrates schematically the interaction of the components of the reclining mechanism disposed between and mechanically engaging the seat bottom and seat back of the at least one seating module. The figures are provided as an exemplary illustration of the recliner mechanism components and are not drawn to accurate scale or interaction. As shown in FIGS. 4a-4d, a tooth or pin 60 is illustrated to represent the gear teeth of the actuator motor.

In operation, the actuator assembly is coupled to the drive motor and moves a set of gear teeth into and out of the gear mechanism of the reversible drive motor. As the drive motor rotates, the gear mechanism assists the seat to move between the at least one upright position and at least one folded position. It is also contemplated that at least one manual release mechanism may be coupled to release the actuator assembly and allow manual movement of the seat between the at least one upright and at least one folded position.

Figure 4A:
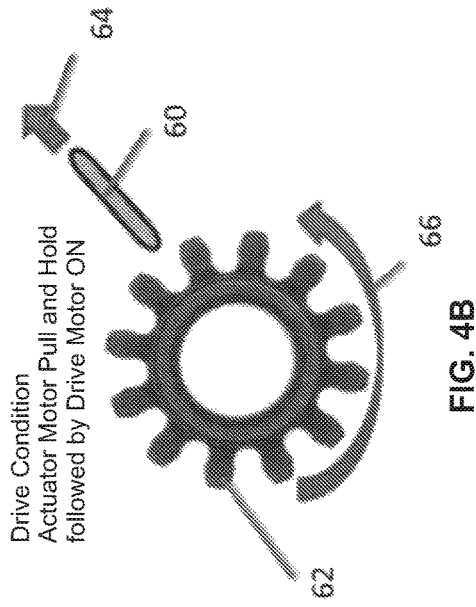
FIG. 4a is a schematic view of the drive motor and actuator of the seating system shown in a parked condition.

FIG. 4a illustrates the drive motor and the actuator in a parked condition. In at least one embodiment of the invention, the parked condition of the seating system represents a condition wherein the at least one seating module is position in the at least one upright position or at least one folded position. In this parked condition, drive motor 62 is stopped from rotation and placed in an inactive condition. Gear teeth of the actuator 60 are released such that the actuator gear teeth engage the gear mechanism of the drive motor 62.

Figure 4B:
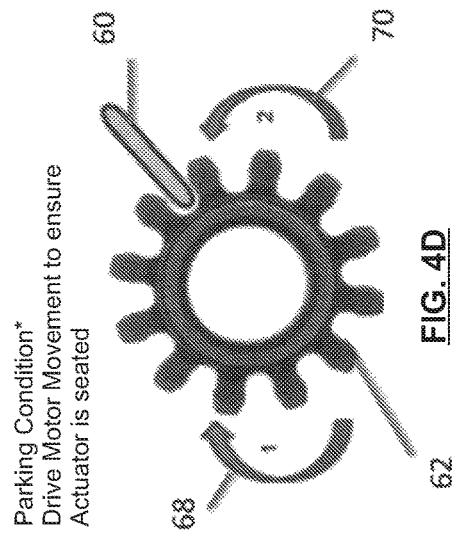
FIG. 4b is a schematic view of the drive motor and actuator of the seating system shown in a drive condition.

FIG. 4b illustrates the gear mechanisms of the drive motor and the actuator in a drive condition. In one of the embodiments of the invention, the drive condition moves the seat bottom and seat back between the at least one upright or seating position to at least one stored or folded position. In this embodiment, gear teeth of actuator 60 are disengaged from the gear mechanism of the drive motor 62 and moved away from drive motor pin in a direction generally represented by arrow 64 to allow the drive motor to rotate as shown by arrow 66 to move the at least one seating module.

Figure 4C:
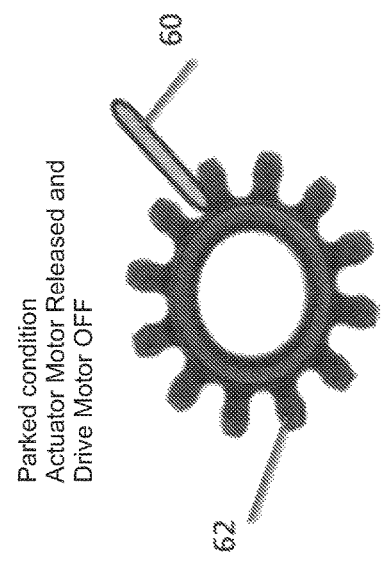
FIG. 4c is a schematic view of the drive motor and actuator of the seating system shown in a stop condition.

FIG. 4c illustrates a stop condition of the seat control system. In this embodiment, the drive motor is off or in an active position. Gear teeth 60 of the actuator are urged toward gear mechanism 62 of the drive motor in the direction represented by arrow 67. In this position, gear teeth 60 of the actuator are moved to be disposed adjacent the gear mechanism 62 of the drive motor in advance of a parking condition.

Figure 4D:
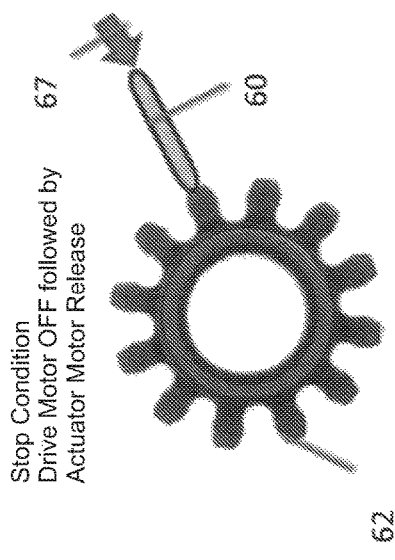
FIG. 4d is a schematic view of the drive motor and actuator of the seating system shown in a parking condition.

FIG. 4d illustrates the parking or confirmation condition of the seat control system. In this embodiment of the present invention, when the seat control system detects the completion of an adjustment of a vehicle seating module, the drive motor is stopped and the actuator is seated, thereby positioning actuator gear teeth 60 in a releasably engaged relationship with the gear mechanism 62 of the drive motor.

The drive motor may be driven in the opposite direction of seat travel as represented by arrow 68 to ensure the actuator gear teeth 60 interconnects with gear mechanism 62. This seating control system process may be referred to as a latch lock confirmation process. In one embodiment of the invention, about one second after the actuator is released, the seat may move in the opposite direction of travel to confirm the latch is locked until either a stall condition is detected or about 400 milliseconds have passed.

The drive motor may be driven in the opposite direction as shown by arrow 70 as part of a latch lock confirmation process to relieve mechanical strain or tension. This seating control system process may be referred to as the system tension relaxation process. In one embodiment of the present invention, about 100 milliseconds after completion of the latch lock confirmation process, the seat shall move in the opposite direction for either specified amount of travel, such as 12 hall count pulses, or 100 milliseconds have passed.

In another embodiment of the present invention, a seat position or fold threshold value may be set to be monitored by the seat control system to detect the position of the seat between the at least one seating or upright position and the at least one stored position or folded position. A sensor assembly may monitor the position of the upper seat assembly or seat back relative to the position of the lower seat assembly or seat bottom and transmit the seat back position value to the control unit for evaluation against the threshold value.

If upon completion of the user requested operation to fold the one or more seating modules the corresponding seat has traveled less than or equal to the seat fold threshold value, the seat will be moved to a parked condition. If upon completion of the user requested operation to fold the one or more seating modules the corresponding seat has traveled greater than the seat fold threshold, the seat may not be parked but rather placed in a drive condition. The seat fold threshold may be set at a variety of positions, such as about a 45-degree angle between the seat back and seat bottom. It is contemplated other angles may be used for the threshold to accomplish the desired results. Alternatively, if the seat, if an unfold operation is completed, the seat may be placed in the parked condition.

It is contemplated that when a user presses a seat switch to stop the movement of the seating module, one or more sensors detect the presence of an object or an obstruction during the seat adjustment procedure or a stall condition is detected, the electronic control module will instruct the at least one drive motor and at least one actuator to implement the parking condition. In another embodiment of the present invention, if a seat parking operation is instructed without a previous direction of seat travel being known by the electronic control module of the seat control system, the direction of seat travel to be used by the electronic control module will be the fold position. The seat control system may adopt a default direction for the latch lock confirmation process as the at least one upright or unfold position while the default direction for the system tension relaxation process will be the at least one folded or stowed position.

Figure 6:
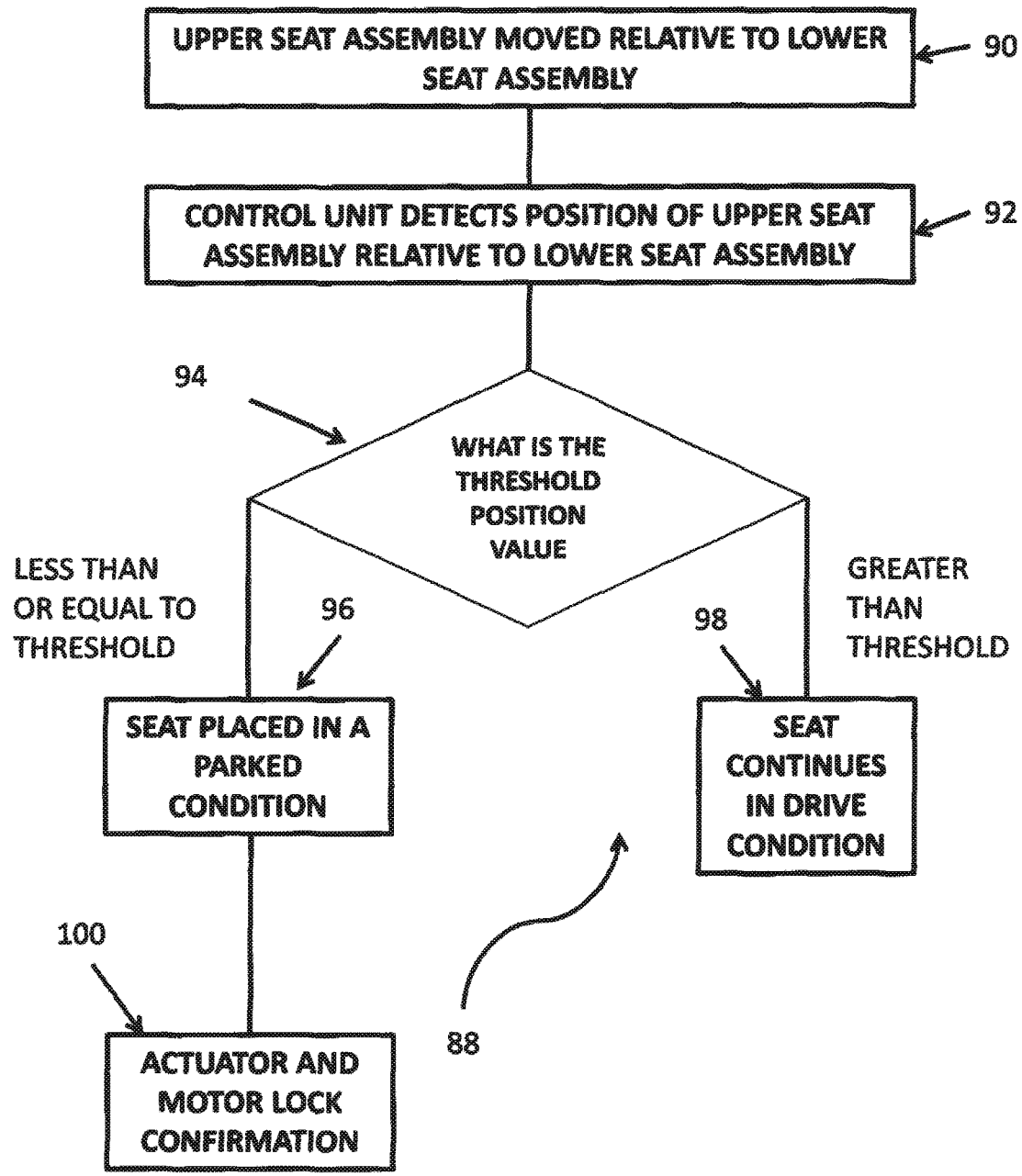
FIG. 6 is a flowchart illustrating the method of controlling adjustment of a vehicle seat in accordance with embodiments of the present invention.

Referring now to FIG. 6, a method of controlling the movement of a vehicle seat is illustrated, generally referred to by reference numeral 88. Block 90 relates to the adjustment of the position of the upper seat assembly relative to the lower seat assembly to one of the at least one upright or at least one folded positions. At block 90, the actuator assembly is moved from an engaged position with the motor as shown in FIG. 4a to disengage from the motor as shown in FIG. 4b to allow the upper seat assembly to adjust relative to the lower seat assembly.

Block 92 relates to the detection of a position of the upper seat assembly relative to the lower seat assembly. A sensor assembly in electrical communication with a control unit determines the position of the upper seat assembly relative to the lower seat assembly and transmits the position to the control unit.

Block 94 represents the evaluation by the control unit of the position of the vehicle seat. The control unit evaluates the position of the upper seat assembly relative to the lower seat assembly against a threshold value to identify whether the upper seat assembly should be placed in a parked condition relative to the lower seat assembly. In one of the non-limiting embodiments of the present invention, the threshold position value used by the control unit is about a 45 degree angle between the upper seat assembly relative to the lower seat assembly.

At block 96, the upper seat assembly is placed in the parked condition relative to the lower seat assembly if the upper seat assembly position value is less than or equal to the threshold value. If the seat position value is greater than the threshold value as shown in block 98, the upper seat assembly remains in a drive condition until the seat folding or unfolding operation is complete.

Block 100 relates to the engagement of the actuator assembly with the motor based upon the position of the upper seat assembly to releasably secure the upper seat assembly relative to the lower seat assembly in one of the at least one upright or at least one folded positions in a parking condition shown FIG. 4d. In the parking condition, the drive motor may be driven in the opposite direction of seat travel to ensure the actuator gear teeth interconnect with gear mechanism of the drive motor 62. Following completion of the latch lock confirmation process, the drive motor may be driven in the opposite direction of the latch lock confirmation process to relieve mechanical strain or tension to complete the system tension relaxation process.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for controlling movement of a seat in a vehicle, the system comprising:
   a lower seat assembly;
   an upper seat assembly adjustable to the lower seat assembly;
   an actuator assembly for selectively adjusting the upper seat assembly relative to the lower seat assembly between at least one upright position and at least one folded position;
   a motor coupled with and selectively engaging the actuator assembly;
   a control unit selectively actuating the motor and actuator assembly to control movement of the upper seat assembly relative to the lower seat assembly; and
   a sensor assembly in electrical communication with the control unit for detecting a position value of the upper seat assembly relative to the lower seat assembly and transmitting the position to the control unit,
   wherein the control unit adjusts the position of the actuator assembly to releasably secure the motor in response to the position value detected by the sensor assembly to place the upper seat assembly in position relative to the lower seat assembly and wherein the motor is driven in an opposite direction to a travel of the upper seat assembly relative to the lower seat assembly and engages the actuator assembly to place the motor and actuator assembly in a releasably secured position.

2. The system of claim 1 further comprising at least one activation element configured to receive user input and in electrical communication with the control unit for selectively adjusting the position of the seat.

3. The system of claim 1 wherein the control unit evaluates the position of the upper seat assembly relative to the lower seat assembly against a threshold value to identify whether the upper seat assembly should be placed in a parked condition relative to the lower seat assembly.

4. The system of claim 3 wherein the upper seat assembly is placed in the parked condition relative to the lower seat assembly if the position value of the upper seat assembly is less than or equal to the threshold value.

5. The system of claim 3 wherein the upper seat assembly is placed in a drive condition to move the upper seat assembly relative to the lower seat assembly if the position value of the upper seat assembly is greater than the threshold value.

6. The system of claim 3 wherein the threshold value is about a 45 degree angle from the upper seat assembly relative to the lower seat assembly.

7. The system of claim 1 further comprising at least one manual release mechanism to release the actuator assembly to allow manual movement of the seat between the at least one upright position and at least one folded position.

8. The system of claim 1 wherein the motor is driven until either a stall condition is detected by the sensor assembly or about 400 milliseconds have passed to place the motor and actuator assembly in the releasably secured position.

9. The system of claim 1 wherein the motor is driven in the direction of travel of the upper seat assembly relative to the lower seat assembly after the actuator assembly and motor are placed in the releasably secured position for a time period to adjust the position and relieve tension between the actuator assembly and motor.

10. The system of claim 9 wherein the motor is driven for about 100 milliseconds in the direction of seat travel to relieve the tension between the actuator assembly and motor.

11. A system for controlling movement of a seat in a vehicle, the system comprising:
    a lower seat assembly;
    an upper seat assembly adjustable to the lower seat assembly;
    an actuator assembly pivotally attached between the lower seat assembly and upper seat assembly for selectively adjusting the upper seat assembly relative to the lower seat assembly between at least one upright position and at least one folded position;
    a motor coupled with and selectively engaging the actuator assembly;
    a control unit selectively actuating the motor and actuator assembly to control movement of the upper seat assembly relative to the lower seat assembly;
    at least one activation element configured to receive user input and in electrical communication with the control unit for selectively adjusting the position of the seat; and
    a sensor assembly in electrical communication with the control unit for detecting a position of the upper seat assembly relative to the lower seat assembly and transmitting the position to the control unit,
    wherein the control unit adjusts the position of the actuator assembly to releasably secure the motor in response to a position value detected by the sensor assembly to place the upper seat assembly in position relative to the lower seat assembly and wherein the motor is driven in an opposite direction to a travel of the upper seat assembly relative to the lower seat assembly and engages the actuator assembly to place the motor and actuator assembly in a releasably secured position.

12. The system of claim 11 wherein the control unit evaluates the position of the upper seat assembly relative to the lower seat assembly against a threshold value to identify whether the upper seat assembly should be placed in a parked condition relative to the lower seat assembly.

13. The system of claim 12 wherein the upper seat assembly is placed in the parked condition relative to the lower seat assembly if the position value of the upper seat assembly is less than or equal to the threshold value.

14. The system of claim 12 wherein the upper seat assembly is placed in a drive condition to move the uppers seat assembly relative to the lower seat assembly if the position value of the upper seat assembly is greater than the threshold value.

15. The system of claim 12 wherein the threshold value is about a 45 degree angle from the upper seat assembly relative to the lower seat assembly.

* * * * *